Patented Oct. 20, 1925.

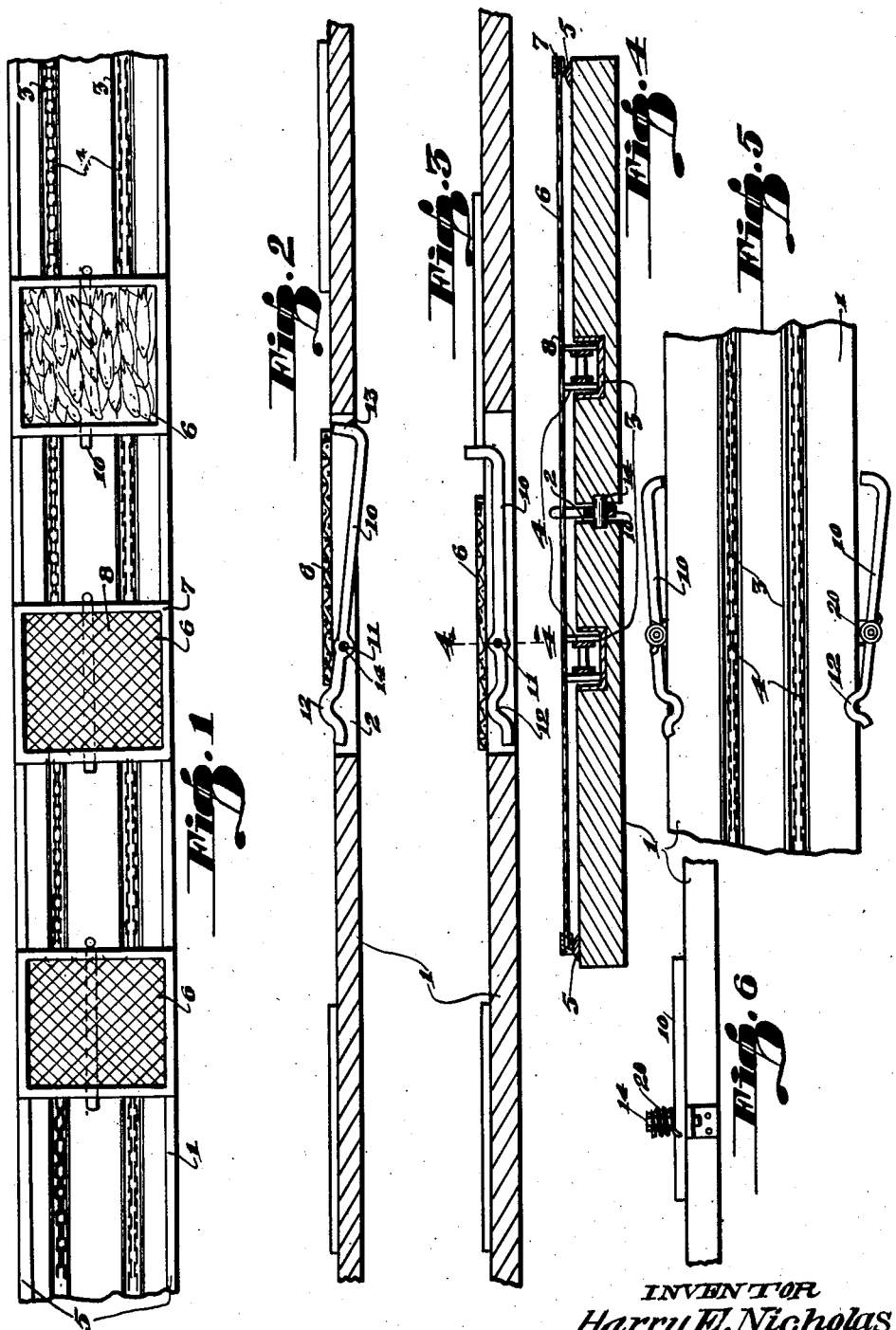

1,557,765

UNITED STATES PATENT OFFICE.

HARRY E. NICHOLAS, OF LOS ANGELES, CALIFORNIA.

AUTOMATIC STOP.

Application filed October 14, 1920. Serial No. 416,861.

*To all whom it may concern:*

Be it known that I, HARRY E. NICHOLAS, a citizen of the United States, residing at Los Angeles, in the county of Los Angeles and State of California, have invented new and useful Improvements in Automatic Stops, of which the following is a specification.

It is the object of this invention to provide an automatic stop adapted to be employed in connection with conveyors for trays and the like. The trays carried by the conveyor may be the usual flat trays known as flakes, which are employed in the fish canning industry.

The invention is particularly applicable to uses in connection with conveyors for moving flakes and the like alongside tables or pairs of tables at which packers stand.

The automatic stops are arranged along the conveyor at the respective tables or pairs of tables, and are so arranged as to stop a loaded tray opposite each of the tables or pairs of the same, and when a loaded tray has been removed to a table to permit the movement of another loaded tray into position to replace the same.

The invention will be readily understood from the following description of the accompanying drawings, in which Figure 1 is a plan view of a conveyor having the automatic stops employed in connection with the same.

Fig. 2 is a longitudinal section through the conveyor showing one of the automatic stops about to be engaged by a loaded tray.

Fig. 3 is a similar view showing the stop after being swung into operative position by a tray.

Fig. 4 is a transverse section on the line 4—4 of Fig. 3.

Fig. 5 is a plan view of a conveyor showing a modified form of the automatic stop.

Fig. 6 is a side elevational view of the modified form of the automatic stop.

The conveyor, in connection with which the automatic stops are employed, may comprise a longitudinally extending base frame 1 having the channel irons 3 received in the base and extending longitudinally of the same. Conveyors 4 shown as chain conveyors are mounted in the channels of each of the bars 3, so as to project above the upper surfaces of base 1. The side edges of the conveyor formed by base 1 may be provided with longitudinally extending strips 5 projecting above the surfaces of the base.

Trays 6 of any preferred construction, shown as usual flakes, are illustrated as comprising frames 7 supporting a mesh 8. These flakes are adapted to move along the conveyor with their side edges supported by strips 5 and the central portion of the flakes frictionally engaged by conveyors 4 so as to move the trays along the conveyor.

At the various points along the conveyor where it is desired to stop the flakes in order that the packers may remove the same, an automatic stop is provided. One of these stops is shown in detail in Figs. 2 and 3. The stop consists of a bar 10 having a bearing 11 through the same intermediate of its ends but closer to its forward end. The forward end of the bar is provided with an upwardly projecting knob 12 and the rear end of the bar is provided with an upwardly extending finger 13. The bar is pivoted at its bearing 11 in a suitable slot 2 provided in base 1, as by means of a bearing pin 14 received in bearing 11 and extending transversely of slot 2.

By providing the pivot for the stop adjacent its forward end, the stop will normally lie in the position shown in Fig. 2 with its rear end having the finger 13 below the plane of the conveyor and the flakes carried by the same. The knob at the forward end of the stop will project above the plane of the conveyor and into alinement with the flakes carried by the same. As a flake moves along the conveyor, it will thus be seen that it will freely pass the finger 13 of the automatic stop lying below the plane of the flake and will impinge against the knob 12 of the stop. As a result the stop will be swung upon its pivot so that the finger 13 projects upwardly in rear of the flake into alinement with the following flakes, as clearly shown in Fig. 3. The movement of the succeeding flakes along the conveyor will thus be stopped. As a result the succeeding flakes will not impinge against the flake which is to be removed, and the packer may thus readily remove the flake without undue exertion.

It will be understood that one of the automatic stops is provided alongside each of the packing tables or pairs of tables, and when a loaded flake which has been stopped, as previously described, is removed from one of the automatic stops to a packing table the stop will swing of its own weight to inoperative position as shown in Fig. 2 and the following loaded flakes upon the conveyor will thus move forward so as to again actuate the stop and thereby prevent continued forward movement of the succeeding flakes until the flake upon the stop is subsequently removed to the packing table.

In the modification of the invention illustrated in Fig. 5 automatic stops are pivoted at the respective sides of a conveyor, the ends 12 of said stops normally projecting over the conveyor so as to be impinged by a tray. The opposite ends of the stops will normally lie beyond the conveyor. The means employed for normally holding the stops in this position may comprise coil springs 20 arranged at the pivots of the stops, or may consist of any other preferred means for yieldably retaining the stops in such position. In operation the stops will be actuated as previously described, to swing the ends 13 of the stops into alinement with the flakes carried by the conveyor.

It will thus be seen that I have provided extremely simple means whereby flakes or the like may be moved along a conveyor and stopped at points where it is desired to remove the flakes, the succeeding flakes moving forward to take the place of the removed flakes as soon as the latter are taken from the conveyor, but being prevented from impingement against the flakes to be removed during said removing operation. By this arrangement loaded flakes will always be positioned at the points where it is desired to remove the same without requiring the attention of an attendant.

Various changes may be made without departing from the spirit of the invention as claimed.

What is claimed is:

1. In combination, a movable conveyor on which articles are adapted to be conveyed, and article operated means for stopping movement of the articles on the conveyor, said means being disposed at intervals along the conveyor so that the stopping of one article will occur in spaced relation to the stopping of an adjacent article.

2. The combination with a conveyer adapted to feed articles placed thereon in succession, of means automatically operated by said articles on travel of said conveyor for holding the articles in spaced relation while on the conveyor.

3. The combination with a continuously traveling conveyer for feeding articles resting thereon, of means automatically operated by said articles for arresting the articles at stations adjacent the conveyor while permitting slipping of the conveyer relatively to the articles thereon.

4. The combination with a continuously traveling conveyer adapted to feed articles in succession, of means controlled by the articles for allowing the continuously traveling conveyer to advance the articles intermittently.

5. The combination with a conveyer for feeding articles in succession, of means stationary in respect to the travel of the conveyer having an element normally remaining out of the path of the articles on the conveyer, said element being automatically moved into the path of the articles on movement of an article by the conveyer into engagement with said means, thereby automatically to arrest feed of the next succeeding article until the article in advance thereof is removed from said means.

6. The combination with a conveyor for feeding articles in succession, of a plurality of stop devices located at intervals in the path of the conveyor having provision automatically by the articles to maintain the articles in predetermined spaced relation on the conveyor and permit removal of the articles from the conveyor without interference by one article with another adjacent thereto.

7. The combination with a conveyor for feeding articles in succession to stations along the conveyor, of means automatically to arrest the articles at the stations, said arresting means having provision permitting an article automatically to advance with the conveyor to occupy a space left by removal of an arrested article from the conveyor.

8. The combination with a table, of a conveyor adapted to positively feed articles along said table, and controlling devices for said articles, each of said devices comprising a pivotally mounted member having a stop and an actuator, said member being adapted to rock automatically to hold the stop out of the path of the articles when an article is out of engagement with the actuator, and said stop being movable into the path of the articles to arrest an article when an article in advance thereof is in engagement with said actuator.

9. In mechanism of the character described, the combination of a conveyor along which articles are moved, and means associated with said conveyor, comprising a series of movable members, respectively adapted to stop such articles, in desired spaced relation, the operation of said means being controlled by such articles themselves.

10. In mechanism of the character described, the combination of a conveyor along which articles are moved, and means associated wtih said conveyor adapted to stop such articles in desired spaced relation, said means including a series of pivotally mounted dogs having their front ends normally disposed in the path of travel of such articles and their rear ends disposed out of such path, engagement of an article with the front end of any such dog being effective to move the rear end thereof into position to engage and stop the next succeeding articles.

11. In a conveyer system, the combination of a continuously traveling conveyer for transporting a series of articles, a stop for said articles normally inoperative, to arrest the movement of the articles, and means arranged to be operated by an article for setting said stop to stop a succeeding article.

In testimony whereof I have signed my name to this specification.

HARRY E. NICHOLAS.